March 20, 1962 J. I. AWEIDA ET AL 3,026,419
OVERLAP DETECTOR
Filed May 11, 1959 2 Sheets-Sheet 1

INVENTOR
JESSE I. AWEIDA
ROBERT B. HUMPHREY
BY
ATTORNEY

3,026,419
OVERLAP DETECTOR
Jesse I. Aweida and Robert B. Humphrey, Poughkeepsie, N.Y., assignors to International Business Machines Corporation, New York, N.Y., a corporation of New York
Filed May 11, 1959, Ser. No. 812,388
8 Claims. (Cl. 250—219)

This invention relates to sheet feeding and more particularly to a device for detecting an overlapped condition during the feeding of sheets of varying thickness.

Numerous mechanical devices are known to the art in which sheets of material such as paper, that are fed in overlapped relation, will rock a lever or the like to close a switch to effect a signal. Devices of this character require very careful and precise adjustment and are subject to wear which destroys their accuracy.

In the present day system of banking, checks of all sizes and thicknesses are used. They range in thickness for statistical card stock of .007 of an inch to the usual folding pocket check of .0035 of an inch. It is apparent that any device must be extremely sensitive to detect an overlap condition during the random feeding of miscellaneous checks.

It is therefore the principal object of the invention to provide a simple and accurate fully electric overlap detector.

Another object is to provide a detector using photoelectric cells to discover an overlap condition while feeding documents of miscellaneous thickness.

The foregoing and other objects, features and advantages of the invention will be apparent from the following more particular description of a preferred embodiment of the invention, as illustrated in the accompanying drawings.

Figure 1:
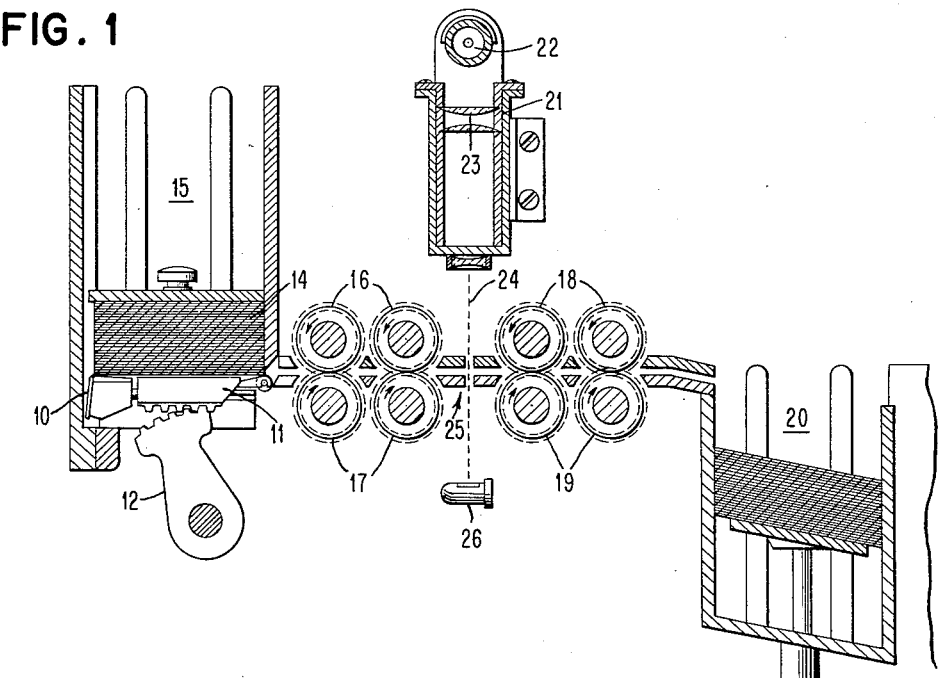
FIG. 1 is a schematic cross section through a card operated machine showing one means for practicing the invention.

One application of the invention is shown in FIG. 1 wherein records such as bank checks are fed through a business machine similar to that shown in the patent to J. J. Robbins et al., 2,448,830. Here a picker knife 10 actuated by any well known means such as the rack 11 and gear segment 12 feeds a check 14 from magazine 15. The checks which may be of different thicknesses are fed to the feed rolls 16 and 17 which carry them through a sensing station and thence by feed rolls 18 and 19 to a receiver 20.

The sensing station shown in FIG. 1 comprises a lamp housing 21 containing a lamp 22 and a lens system 23 for directing a beam of light 24 through a slot 25 in the plates forming the path of the record while passing from feed rolls 16—17 and 18—19. Located below the card path and aligned with the light beam 24 is a photocell 26 of the type known as a solar cell of the PN variety.

Figure 2:
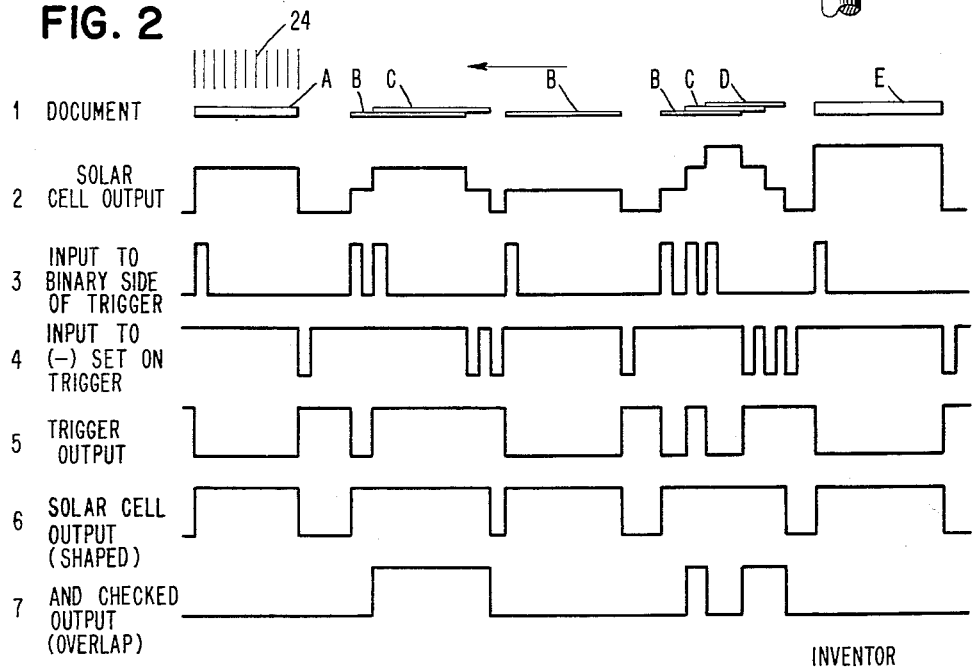
FIG. 2 is a chart indicating the different overlap conditions and the pulses created in an electronic circuit by those conditions.

Disregarding the circuit which will be described in detail later, it is believed that the logic of the circuit can be best understood by reference to FIGS. 2 and 3. In FIG. 2 it will be seen that any change in the intensity of the beam 24 will alter the output of the solar cell. In other words the output is adjusted to be a function of the thickness of an average document. For document A (row 1) the output is a square wave going positive at the start of the document passing through the beam 24 in the direction of the arrow and going negative after the document passes out of the beam. Documents B and C of similar material when fed together are equal to A in thickness. Therefore, the combined height of the stepped signal is equal to that for A. However, it is to be noted that the signal goes positive upon B entering the beam and then levels off and goes positive with greater potential upon C entering the beam. When the trailing edge of B leaves the beam the wave goes negative an amount equal to the density of the document and then goes full negative when the trailing edge of document C leaves the beam. The signal for B alone is shown in column 3, documents B, C and D form the stepped signal of the fourth column and E forms a square signal of the greater potential due to its greater thickness.

Figure 3:
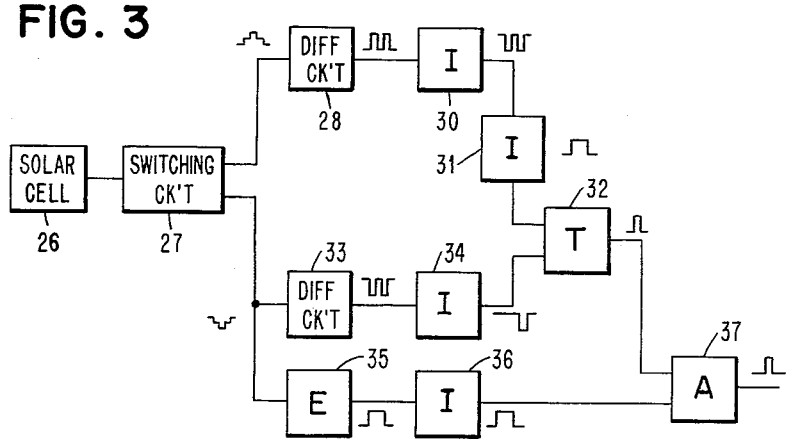
FIG. 3 is a diagram of the logic used to obtain the signal indicating an overlap.

Referring now to FIG. 3 it will be seen that impulses from the solar cell 26 and associated switching circuit 27 follow two paths, the signal in one being the complement of the other. The upper signal is differentiated at 28 and inverted twice at 30 and 31 before operating a trigger 32. The lower signal is divided and follows two paths. One path in which the signal is differentiated at 33 and inverted at 34 before setting "on" the trigger 32. In the other path the signal passes through an emitter follower 35 and is inverted at 36 before entering an AND circuit 37. If a signal from the trigger 32 is positive and coincident with the signal passing through the emitter AND circuit will be operated to give a signal indicating an overlap condition. Referring again to FIG. 2 and following column 1 it will be seen that the leading edge of a single document A will cause the solar cell to generate an increase in voltage which will remain constant until the trailing edge passes out of the beam 24 at which time the voltage is decreased. This signal will be shaped by passing through the differentiating circuit 28 and inverters 30 and 31 into a sharp pulse coincident with the leading edge of the card which will turn off the normally set-on binary trigger 32. The trigger will remain off until a pulse generated by the trailing edge and shaped by differentiating circuit 33 and inverter 34 turns it on again. The signal generated by the solar cell is shaped by passing through emitter follower 35 and inverter 36 will be of a duration equal to the passage of a document or documents through the beam 24. Referring to rows 5 and 6 of FIG. 2 it will be seen that the trigger is off and therefore has no output. Since there is no trigger output to balance the solar cell output the AND circuit 37 will not be operated and no overlap signal given.

Referring to column 2 of FIG. 2 in which documents B and C are fed in overlapping relation it will be seen that the voltage generated by the solar cell decreases as the leading edge of document B passes into the beam 24. It decreases further as the leading edge of document C enters the beam. The reverse is true as the trailing edges leave the beam. Each of these decreases will be shaped in the circuit 28, 30 and 31 to form two positive spikes, the first of which will turn the trigger off and the second will turn it on again. The two negative pulses in row 4 which would normally turn the rigger on will have no effect since it is already on. In this instance since the trigger is on and generating an output and a signal is generated by the solar cell the AND circuit will be operated to produce an overlap signal.

From the above it will be apparent that one leading edge will turn the trigger off and a trailing edge will return it to normal ON condition. A second leading edge following within a certain time, indicating an overlap condition, will turn the trigger ON again. With the trigger ON and producing an output the AND circuit will be operated by the signal from the solar cell to indicate an overlap condition.

Figure 4:
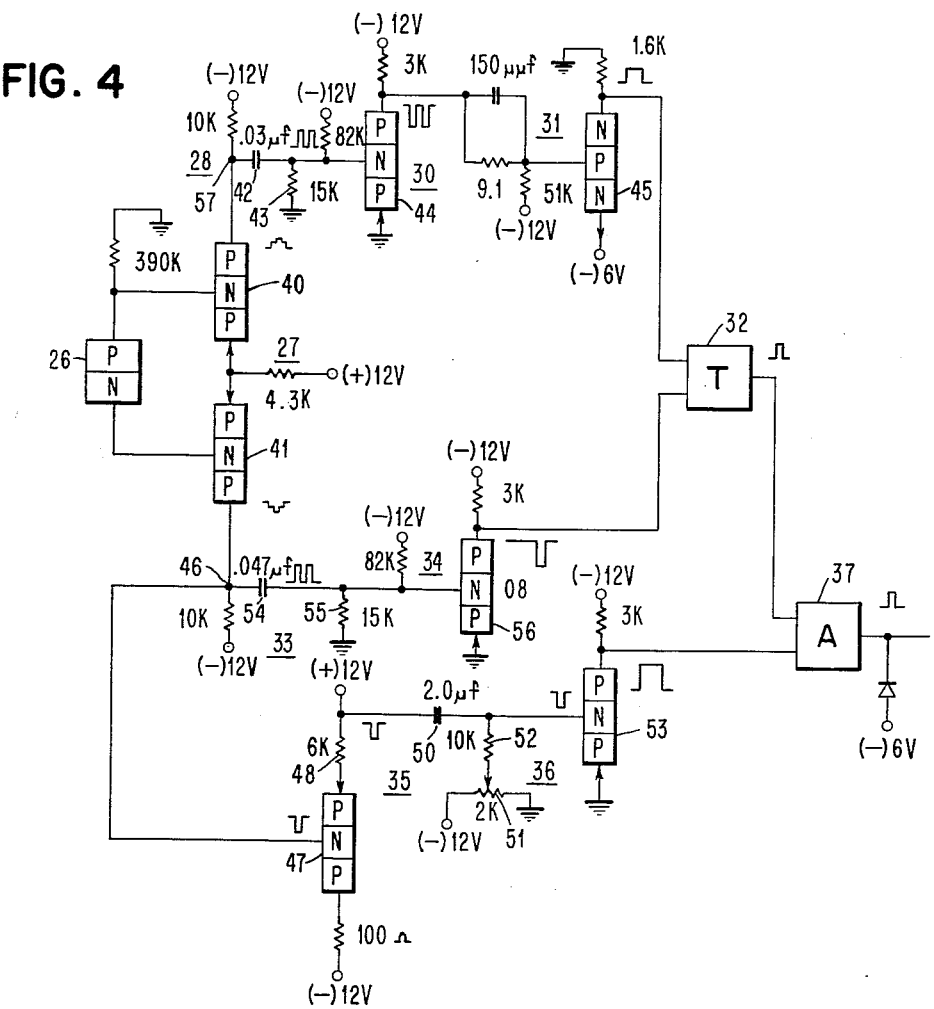
FIG. 4 is a schematic diagram of the circuit of the invention.

In the circuit of FIG. 4 the solar cell 26 is connected across the bases of two PNP transistors 40 and 41. Their emitters are connected to a positive 12 volt source and their collectors are connected to minus 12 volts thus forming a switching circuit. The base of transistor 40 is connected to ground to make it more negative than transistor 41 and so is conducting. This circuit is modified by the PN solar cell 26 which when there is no light on the cell increases the resistance in the circuit. When light strikes the cell the resistance is reduced and a voltage is generated which is modified in accordance with the amount and duration of the light on the cell. In the normal condition of the circuit the base of transistor 41 is more negative and is conducting and transistor 40 is OFF. When the leading edge of a document modifies the light reaching the cell 26, transistor 41 goes negative and transistor 40 goes positive generating a signal that is differentiated by the .03 mf. condenser 42 and 15K resistance 43. This signal is then inverted and amplified by the transistor 44 and is again inverted and amplified by the transistor 45. This signal then turns the trigger 32 OFF. The leading edge of a second overlapping document will follow the same circuit expect since the trigger is of a binary type this signal from the transistor 45 will turn the trigger ON.

Since the signal at point 46 is negative and the complement of the signal at point 57 it must be shaped to provide a square wave signal for the input to the AND circuit 37. This circuit is traced from point 46 through transistor 47, 6K resistance 48 and 2 mf. condenser 50 which forms the emitter of transistor 47, 6K resistance 48 and 2 mf. condenser 50 which forms the emitter follower 35. A clipping circuit is traced from ground through a 2K variable resistance 51 and a 10K resistance 52 shapes the signal before controlling the transistor 53. With the 2K resistance adjusted out the signal width will be greater and with the 2K all in the circuit the signal will be narrowed. With transistor 53 conducting a positive signal will go to the AND circuit 37. Since there was a positive signal from the trigger 32 the AND circuit will operate giving an output signal indicating an overlap condition.

As the documents B and C pass out of the beam 24 the trailing edge of document B will permit more light to reach solar cell 26 thereby causing transistor 40 to be cut OFF and 41 to conduct. A signal now passes through the .047 mf. condenser 54 and 15K resistance 55 comprising the differentiating circuit 35 and thence through the transistor 56 where the signal is inverted and would turn ON trigger 32 except that it is already ON. The trailing edge of the document C generates a similar circuit that again attempts to turn ON the trigger.

If only one document had passed through the beam 24 the trigger would have been OFF and the trailing edge passing a signal through 54, 55 and 56 would turn the trigger ON.

It will be noted by reference to column 4 of FIG. 2 that if an odd number of documents such as B, C and D are fed in overlapped relation the leading edges of B will cause the trigger to go OFF on the first pulse, go ON on the second pulse and OFF on the third. It is ON long enough however to actuate the AND circuit and give a signal of overlap. The first signal generated by trailing edge of document B will turn the trigger ON and it will remain ON.

While the invention has been particularly shown and described with reference to a preferred embodiment thereof, it will be understood by those skilled in the art that various changes in form and details may be made therein without departing from the spirit and scope of the invention.

What is claimed is:

1. In a sheet feeding device, an overlap detector comprising a light sensitive means, a light beam for actuating said cell directed across the path of a sheet being fed, a binary trigger circuit, a coincident circuit, a signal circuit controlled by said coincident circuit, said light sensitive means controlling the on and off condition of said trigger upon a sheet entering and leaving said beam, said trigger circuit controlling a first input to said coincident circuit, and a circuit activated by any change in intensity of said beam for controlling a second input to said coincident circuit whereby the leading edge of a sheet entering said beam will turn off said trigger circuit, a second sheet fed in overlapped relation will turn on said trigger circuit to activate said coincident circuit and said signal circuit to indicate an overlap condition.

2. In a sheet feeding device, an overlap detector comprising a light sensitive means, a light beam for actuating said cell directed at right angles to the path of a sheet being fed, a binary trigger circuit, an AND circuit, a signal circuit controlled by said AND circuit, said light sensitive means controlling the on and off condition of said trigger upon a sheet entering and leaving said beam, said trigger circuit controlling a first input to said AND circuit, and a circuit activated by any change in intensity of said beam for controlling a second input to said AND circuit whereby the leading edge of a sheet entering said beam will turn off said trigger circuit, a second sheet fed in overlapped relation will turn on said trigger circuit to activate said AND circuit and said signal circuit to indicate an overlap condition.

3. In a sheet feeding device, an overlap detector comprising a solar cell, a light beam for actuating said cell directed at right angles to the path of a sheet being fed, a binary trigger circuit, an AND circuit, a signal circuit controlled by said coincident circuit, said solar cell controlling the on and off condition of said trigger upon a sheet entering and leaving said beam, said trigger circuit controlling a first input to said AND circuit, and a circuit activated by any change in intensity of said beam for controlling a second input to said AND circuit whereby the leading edge of a sheet entering said beam will turn off said trigger circuit, a second sheet fed in overlapped relation will turn on said trigger circuit to activate said AND circuit and said signal circuit to indicate an overlap condition.

4. In a sheet feeding device, an overlap detector comprising a light sensitive means, a light beam for actuating said cell directed at right angles to the path of a sheet being fed, a binary trigger circuit, a coincident circuit, a signal circuit controlled by said coincident circuit, said light sensitive means acting over a transistor circuit for controlling the on and off condition of said trigger upon a sheet entering and leaving said beam, said trigger circuit controlling a first input to said coincident circuit and a second transistor circuit activated by any change in intensity of said beam for controlling a second input to said coincident circuit whereby the leading edge of a sheet entering said beam will turn off said trigger circuit, a second sheet fed in overlapped relation will turn on said trigger circuit to activate said coincident circuit and said signal circuit to indicate an overlap condition.

5. In a sheet feeding device, an overlap detector comprising a solar cell, a lamp and lens system for focusing a light beam on said cell, means for feeding sheets through said beam, a switching circuit associated with said cell including two transistors each having emitter, base and collector electrodes, said bases being connected to said cell, one of said bases being biased negative, a common positive voltage connected to said emitters, a binary trigger, an AND circuit controlling a signal, the collector circuits being connected through differentiating and inverting circuits to said trigger, one of said collector circuits setting said trigger on, the other of said collector circuits turning said trigger off, said trigger controlling the first of two inputs of said AND circuit and a third circuit generating and shaping a signal for the second input of said AND circuit whereby when the leading edge of a sheet enters said beam a signal is generated to turn said trigger off, upon a second sheet being fed in overlapped relation said trigger is turned on actuating said AND circuit and signalling an overlap condition.

6. In a sheet feeding device, an overlap detector comprising a light sensitive means, a light source and lens system for focusing a light beam on said cell, means for feeding sheets through said beam, a switching circuit associated with said cell including two transistors, a binary trigger, a coincident circuit controlling a signal, said first transistor being connected through differentiating and inverting circuits to said trigger, one of said second transistor circuits setting said trigger on the other of said transistor circuits turning said trigger off, said trigger controlling the first of two inputs of said coincident circuit and a third transistor circuit generating the second input of said coincident circuit whereby when the leading edge of a sheet enters said light beam a signal is generated to turn said trigger off, said trigger being turned on upon a second sheet being fed in overlapped relation to actuate said coincident circuit and signal an overlap condition.

7. In a sheet feeding device, an overlap detector comprising a solar cell, a lamp and lens system for focusing a light beam on said cell, means for feeding sheets through said beam, a switching circuit associated with said cell including two transistors each having emitter, base and collector electrodes, said bases being connected to said cell, one of said bases being biased negative, a common positive voltage connected to said emitters, a binary trigger, a coincident circuit controlling a signal, the collector circuits being connected through differentiating and inverting circuits to said trigger, one of said collector circuits setting said trigger on the other of said collector circuits turning said trigger off, said trigger controlling the first of two inputs of said coincident circuit and a third circuit generating and shaping a signal for the second input of said coincident circuit whereby when the leading edge of a sheet enters said beam a signal is generated to turn said trigger off, said trigger being turned on upon a second sheet being fed in overlapped relation to actuate said coincident circuit and signal an overlap condition.

8. In a sheet feeding device, an overlap detector comprising a light sensitive means, a light source actuating said cell, means for feeding sheets between said light sensitive means and said light source, a switching circuit associated with said light sensitive means including two transistors each having emitter, base and collector electrodes, said bases being connected to said cell, one of said bases being biased to one polarity, a common voltage of an opposite polarity connected to said emitters, a binary trigger, a coincident circuit controlling a signal, the collector circuits being connected to said trigger, one of said collector circuits setting said trigger on the other of said collector circuits turning said trigger off, said trigger controlling the first of two inputs of said coincident circuit and a third circuit generating a signal for the second input of said coincident circuit whereby when the leading edge of a sheet partially extinguishes the light from said light source, a signal is generated to turn said trigger off, said trigger being turned on upon a second sheet being fed in overlapped relation to actuate said coincident circuit and signal an overlap condition.

References Cited in the file of this patent

UNITED STATES PATENTS

| 2,072,236 | Wormser | Mar. 2, 1937 |
| 2,570,288 | Todd | Oct. 9, 1951 |
| 2,749,533 | Daniels | June 5, 1956 |
| 2,946,992 | Broido | July 26, 1960 |